(12) United States Patent
Jacques et al.

(10) Patent No.: US 10,766,228 B2
(45) Date of Patent: Sep. 8, 2020

(54) COATED FILM STRUCTURES WITH AN ALUMINUM OXIDE INTERMEDIATE LAYER

(71) Applicant: Michelman, Inc., Cincinnati, OH (US)

(72) Inventors: Francis Jacques, Windhof (LU); Robin Cooper, Attert (BE); Kevin Gillie, West Chester, OH (US); Rymma Sushko, Windhof (LU)

(73) Assignee: Michelman, Inc., Cincinnati ( * ) Notice: Subject to any disclaimer, the term of this patent is extended or adjusted under 35 U.S.C. 154(b) by 0 days.

(21) Appl. No.: 15/858,233

(22) Filed: Dec. 29, 2017

(65) Prior Publication Data

US 2018/0186123 A1     Jul. 5, 2018

Related U.S. Application Data

(60) Provisional application No. 62/440,558, filed on Dec. 30, 2016.

(51) Int. Cl.
    *B32B 15/01*        (2006.01)
    *B32B 33/00*        (2006.01)
    *C08J 7/04*          (2020.01)

(52) U.S. Cl.
    CPC ........... *B32B 15/016* (2013.01); *B32B 33/00* (2013.01); *C08J 7/0423* (2020.01);
            (Continued)

(58) Field of Classification Search
    CPC ..................................................... C08J 7/045
    See application file for complete search history.

(56) References Cited

U.S. PATENT DOCUMENTS 5,508,113 A * 4/1996 Knoerzer ................ B32B 27/32
                                                       428/36.6
6,004,660 A    12/1999 Topolski et al.
(Continued)

FOREIGN PATENT DOCUMENTS

JP        H10-72659    *   3/1998 ............... B05D 7/04
JP        H10 72659 A     3/1998
(Continued)

OTHER PUBLICATIONS

Yamamoto—JP H10-72659 A—MT-alumina layer+PVA+silane—1998 (Year: 1998).*

(Continued)

*Primary Examiner* — Callie E Shosho
*Assistant Examiner* — John Vincent Lawler
(74) *Attorney, Agent, or Firm* — Vorys, Sater, Seymour and Pease LLP

(57) ABSTRACT

Embodiments of the present disclosure provide a coated film structure including a substrate layer, an overcoat layer, and at least one intermediate layer disposed between the substrate layer and the overcoat layer. The substrate layer includes a polymer film substrate, the overcoat layer includes polyvinyl alcohol, and the at least one intermediate layer includes aluminum oxide. The substrate layer has a thickness from 1 μm to 120 μm and the overcoat layer has a dry coat weight of from about 0.05 g/m² to about 1.5 g/m². The coated film structure has an oxygen transmission rate of less than about 0.70 cm³/m²/day at 90% relative humidity and 23° C. as measured in accordance with ASTM D3985. Further, the coated film structure has a water vapor transmission rate of less than 1.00 g/m2/day at 90% relative humidity and 37.8° C. as measured in accordance with ASTM E-398.

18 Claims, 3 Drawing Sheets

(52) U.S. Cl.
CPC ....... *B32B 2255/26* (2013.01); *C08J 2367/02* (2013.01); *C08J 2429/04* (2013.01)

(56) References Cited

U.S. PATENT DOCUMENTS

| | | | |
|---|---|---|---|
| 6,709,735 | B2 | 3/2004 | Posey et al. |
| 7,282,273 | B2 * | 10/2007 | Murphy .............. C09D 129/04 427/391 |
| 7,648,737 | B2 | 1/2010 | Ogino et al. |
| 7,695,822 | B2 * | 4/2010 | Su ........................... B32B 7/12 428/500 |
| 7,862,869 | B2 | 1/2011 | Papenfuss et al. |
| 8,945,702 | B2 | 2/2015 | Wuest et al. |
| 9,238,324 | B2 | 1/2016 | Dou et al. |
| 9,314,999 | B2 | 4/2016 | Cloutier et al. |
| 9,492,962 | B2 | 11/2016 | Dou et al. |
| 2004/0076778 | A1 | 4/2004 | Mori et al. |
| 2006/0251905 | A1 | 11/2006 | Arakawa |
| 2009/0047529 | A1 | 2/2009 | Kawashima et al. |
| 2010/0062117 | A1 | 3/2010 | Illsley |
| 2011/0236703 | A1 * | 9/2011 | McGee ...................... C08J 5/18 428/463 |
| 2012/0003458 | A1 | 1/2012 | Wu et al. |
| 2012/0003484 | A1 * | 1/2012 | Roehrig ................... B05D 1/60 428/447 |
| 2014/0127498 | A1 * | 5/2014 | Ibanez .................. C09D 5/002 428/336 |
| 2014/0309334 | A1 * | 10/2014 | Kramer .................. C08G 59/50 523/400 |
| 2015/0221886 | A1 | 8/2015 | Klun et al. |
| 2015/0243928 | A1 | 8/2015 | Grunlan et al. |
| 2015/0298861 | A1 | 10/2015 | Dabadie et al. |
| 2015/0343748 | A1 | 12/2015 | Broyles et al. |
| 2016/0185498 | A1 | 6/2016 | Henderson |
| 2017/0057727 | A1 | 3/2017 | Paolilli et al. |
| 2017/0183467 | A1 | 6/2017 | Kravitz |
| 2017/0210867 | A1 | 7/2017 | Cooper et al. |

FOREIGN PATENT DOCUMENTS

| | | | |
|---|---|---|---|
| JP | 2008264998 | A | 11/2008 |
| JP | 2010000678 | A | 1/2010 |
| JP | 2010253862 | A | 11/2010 |
| JP | 2014169352 | A | 9/2014 |
| JP | 2017513746 | A | 6/2017 |
| KR | 10-2008-0109022 | A | 12/2008 |
| WO | 200140357 | A1 | 6/2001 |
| WO | 2003089502 | A1 | 10/2003 |
| WO | 2003089503 | A1 | 10/2003 |
| WO | 2007034941 | A1 | 3/2007 |
| WO | 2007034943 | A1 | 3/2007 |
| WO | 2015/157593 | A1 | 10/2015 |
| WO | WO-2015157593 | A1 * | 10/2015 ............... B05D 7/04 |
| WO | 2017005597 | A1 | 1/2017 |
| WO | 2017210087 | A1 | 12/2017 |

OTHER PUBLICATIONS

Swager, "Nichigo G-Polymer," TAPPI 2010 Place Conference (Year: 2010).*
Sherman, "BOPET films' growth prospects look very good," Plastics Technology (Year: 2016).*
Polyvinyl alcohol _ CH2CHOH—PubChem—2018 (Year: 2018).*
Nichigo G-Polymer—Info (Year: 2018).*
Charlon—structure-barrier prop biodegradable polymers—influence of rigid amorphous fraction—2015 (Year: 2015).*
International Search Report pertaining to PCT International Application No. PCT/US2017/068964, filed Dec. 29, 2017, 5 pages.
Written Opinion pertaining to PCT International Application No. PCT/US2017/068964, filed Dec. 29, 2017, 7 pages.
EP Office Action dated May 25, 2020 in related matter (citing references submitted herein).
JP Office Action dated May 27, 2020 in related matter (citing references submitted herein).

* cited by examiner

COATED FILM STRUCTURES WITH AN ALUMINUM OXIDE INTERMEDIATE LAYER

CROSS-REFERENCE TO RELATED APPLICATIONS

This application claims benefit to U.S. Provisional Application Ser. No. 62/440,558 filed Dec. 30, 2016.

TECHNICAL FIELD

Embodiments of the present disclosure are generally related to coatings for use on film substrates. More specifically, embodiments of the present disclosure are related to coated film structures including a layer comprising aluminum oxide which have improved oxygen and water vapor barrier properties.

BACKGROUND

Polymeric film substrates may be coated with various materials to impart various desired properties to the substrates. These properties include, but are not limited to, sealability, water and grease resistance, adhesion, and tear or puncture resistance. In some instances, the coating materials may incorporate metals or metal oxides. These types of coatings are particularly important in the flexible packaging industry which may utilize polymeric film substrates. Packaging items such as pouches and bags used for storing food may involve polymeric film substrates. In these items, barrier properties may be desired in the polymeric film substrates to improve durability of the package and quality and shelf life of the package contents.

Metal and metal oxide coatings are used to improve the barrier of plastic films used in packaging. However, the performance of these coatings tends to diminish during processing of the film. For example, the film is kept under tension when it is wound and unwound during printing and lamination processes. The tension can cause cracking of the coatings deposited on the film. Additionally, the surface of the film is also in contact with rollers and guides that can abrade and scratch the coatings. These damages to the coating can affect the barrier properties of the coated polymeric films with regards to water vapor and oxygen transmission rates.

SUMMARY

Accordingly, there is a continual need for a coated film structure that exhibits improved barrier performance to water vapor and oxygen. Moreover, there is a need for a coated film structure which includes aluminum oxide that exhibits favorable water vapor and oxygen transmission rates. The embodiments of the present disclosure meet these needs.

Embodiments of the present disclosure provide a coated film structure including a substrate layer, an overcoat layer, and at least one intermediate layer disposed between the substrate layer and the overcoat layer. The substrate layer includes a polymer film substrate, the overcoat layer includes polyvinyl alcohol, and the at least one intermediate layer includes aluminum oxide. The substrate layer has a thickness from 1 μm to 120 μm and the overcoat layer has a dry coat weight of from about 0.05 $g/m^2$ to about 1.5 $g/m^2$. The coated film structure has an oxygen transmission rate of less than about 0.70 $cm^3/m^2$/day at 90% relative humidity and 23° C. as measured in accordance with ASTM D3985. Further, the coated film structure has a water vapor transmission rate of less than 1.00 g/m2/day at 90% relative humidity and 37.8° C. as measured in accordance with ASTM E-398.

According to one or more embodiments, a coated film structure further comprises a rigid amorphous fraction (RAF) at an interface of the overcoat layer and the at least one intermediate layer. The overcoat layer may comprise at least 20 percent by weight (wt. %) RAF, based on the applied total dry weight of the overcoat layer. In other embodiments, the overcoat layer may comprise an amorphous polyvinyl alcohol.

BRIEF DESCRIPTION OF DRAWINGS

The following detailed description of specific embodiments of the present disclosure can be best understood when read in conjunction with the following drawings, where aspects of the structure are indicated with corresponding reference numerals and in which.

DETAILED DESCRIPTION

Figure 1:
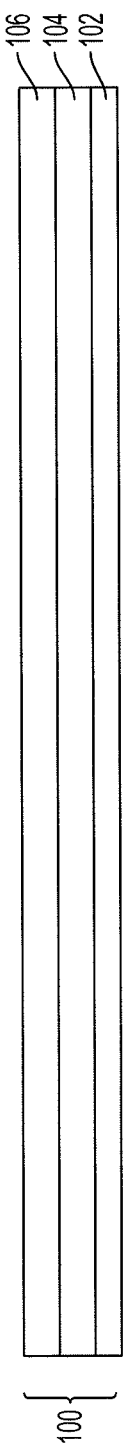
FIG. 1 schematically depicts a cross-sectional side view of a coated film structure, according to one or more embodiments described herein.

Reference will now be made in detail to various embodiments of the coated structures. The components of the coated film structure include a first substrate layer including at least one polymer film, an intermediate layer including aluminum oxide, and an overcoat layer. The coated film structures of various embodiments may exhibit increased barrier performance to moisture vapor and oxygen.

In various embodiments, the substrate layer includes at least one polymer film substrate. The polymer film substrate may be a polyolefin, such as a substrate including at least one polyethylene or polypropylene, a polyester substrate, or combinations thereof. By way of example and not limitation, the polymer film may comprise polyethylene, polypropylene, biaxially oriented polyethylene terephthalate (BOPET), biaxially oriented polypropylene (BOPP), polylactic acid (PLA), polyhydroxyalkanoate (PHA), polypropylene, biaxially oriented polyamide, nylon, or polyvinyl chloride. In certain embodiments, the polymer substrate includes polyester, such as BOPET. According to other embodiments, the polymer substrate includes a polypropylene. Suitable polypropylenes include, but are not limited to, BOPP.

In one or more embodiments, the substrate layer has a thickness from 1 μm to 120 μm. In other embodiments, the substrate layer has a thickness from 1 μm to 100 μm, from 1 μm to 80 μm, from 1 μm to 60 μm, from 1 μm to 50 μm, from 5 μm to 120 μm, from 5 μm to 100 μm, from 5 μm to 80 μm, from 5 μm to 60 μm, from 5 μm to 50 μm, from 10 μm to 120 μm, from 10 μm to 100 μm, from 10 μm to 80 μm, from 10 μm to 50 μm, or from 10 μm to 30 μm. Coated film structures that have too thin of a substrate layer may be more susceptible to punctures or tears. Coated film structures that have too thick of a substrate layer may have inadequate flexibility and the coatings may be less durable to deformation.

One or both of the surfaces of the polymer film substrate may be surface-treated. Surface treatments may, for example, improve receptivity of the polymer film substrate to metallization, coatings, printing inks, lamination, or combinations thereof. By way of example and not limitation, one or both surfaces of the polymer film substrate may be subjected to one or more of a corona discharge treatment, a flame treatment, a plasma treatment, a chemical treatment, or the like. Chemical treatments include chemical etching with acids, bases, or oxidizing agents. The chemical treatment used for chemical etching may include nitric acid, potassium chromate, trichloric acid, or combinations thereof.

The coated film structure of various embodiments includes at least one overcoat layer. In one embodiment, the overcoat layer may include polyvinyl alcohol. The polyvinyl alcohol may be, in some embodiments, an amorphous polyvinyl alcohol. The amorphous polyvinyl alcohol, unlike crystalline polyvinyl alcohol and semi-crystalline polyvinyl alcohol, does not have an ordered arrangement of molecules. The term "amorphous," as used herein, refers to polymers that do not have an ordered structure or arrangement of molecules. This is in contrast to crystalline polymers, which exhibit an ordered structure or arrangement of molecules. Typically, an increase in the crystallinity of a compound corresponds to an increase in the material strength, which improves the barrier properties of the polymer. As used herein, the term "semi-crystalline" refers to polymers, which may have both crystalline regions and amorphous regions.

One such suitable amorphous polyvinyl alcohol for use in the overcoat layer is commercially available from Nippon Gohsei under the designation G-Polymer™ OKS-8049 or AZF-8035W. OKS-8049 has a melting point of 185° C. and a viscosity of 4.5 mPa·s at 4% aqueous solution at 20° C., and AZF8035W has a melting point of 171° C. and a viscosity of 3.0 mPa·s at 4% aqueous solution at 20° C. In certain embodiments, the polyvinyl alcohol may be applied as an aqueous solution or emulsion.

In some embodiments, a polyethylene wax may be added to the overcoat layer to improve abrasion resistance. For example, the overcoat layer may further comprise a hard oxidized polyethylene wax. The overcoat layer may also comprise other waxes such as carnauba wax, a soy wax, a paraffin wax, a scale wax, a slack wax, other vegetable waxes, or mixtures and combinations thereof.

In one or more embodiments, the overcoat layer may further include an adhesion promoter. Suitable adhesion enhancers may include, by way of example and not limitation, polyethyleneimine (PEI) adhesion enhancers, such as PEI Loxanol® MI6730, available from BASF (Ludwigshafen, Germany), aliphatic polyurethane dispersions, hydrogenated hydrocarbon rosin or rosin ester dispersions, and amorphous acrylic polymer dispersions. Other adhesion enhancers may be employed, provided they enhance adhesion of the overcoat layer to the substrate or other layers of the coated film structure to which it is applied. Without being bound by theory, the polyethyleneimine or polyurethane may act as an adhesion promoter to achieve good adhesion of the coating to a polymeric substrate. A commercial embodiment of a suitable polyethyleneimine is Lupasol P from BASF. Other suitable commercial embodiments of polyethyleneimine include Polymin P, available from BASF, Epomin, available from Nippon Shokubai, TITA Bond T100, available from Nippon Soda Co., and D1 Dry AC-108, available from DIC Graphics. In other embodiments, the adhesion promoter comprises polyurethane. The polyurethane may be used as an alternative to or in addition to polyethyleneimine. Commercial embodiments of suitable polyurethane include 86A from 3M, SYNTEGRA from Dow Chemical, Desmophen from Bayer AG and Loctite 3951 from Loctite.

In some embodiments of the present disclosure, the overcoat layer may further include a crosslinker. The crosslinker may comprise an aldehyde, dialdehyde, organic salt, inorganic salt, or a combination thereof. The crosslinker may, in some embodiments, comprise melamine formaldehyde. In other embodiments, the crosslinker may comprise urea formaldehyde, glyoxal, glutaraldehyde, zirconium oxide, zinc oxide, titanium lactate, or any other crosslinking agents that interconnects and crosslinks polyvinyl alcohol molecules as the overcoat layer cures or dries. Without being bound by theory, crosslinkers are believed to be beneficial in the present coatings, because amorphous polyvinyl alcohol that is crosslinked exhibits better barrier characteristics than not crosslinked polyvinyl alcohol. Polyvinyl alcohol is soluble in water and can be susceptible to attack by moisture, making it desirable to crosslink the polyvinyl alcohol to provide an improved barrier to decrease the oxygen transmission rate and to also provide resistance to delamination in humid environments.

Suitable commercial embodiments of a crosslinker include Cymel 385 resin, produced by Allnex (Brussels, Belgium) and Aerotex 3030, Aerotex 3730, or Aerotex M3, produced by Emerald Performance Materials (Charlotte, N.C.). Other suitable commercial embodiments of a crosslinker include Beetle PT312 Resin from BIP Company (Oldbury, UK), as well as many other suitable Cymel grade crosslinkers.

In various embodiments, especially those including a crosslinker, the overcoat layer may further comprise a catalyst. It can be difficult for the crosslinker to fully crosslink throughout a layer of polyvinyl alcohol; therefore, a crosslinking-promoting catalyst may be desirable. The optional catalyst may, in some embodiments, be an organic or inorganic acid catalyst, or a salt of an organic or inorganic acid catalyst. The amount of optional catalyst used may, in some embodiments, be a quantity needed to get the pH of the primer coating solution between 2 and 6. In some embodiments, the optional acid catalyst will cause the primer coating solution to have a pH between 2 and 7 or between 2 and 6. The optional acid catalyst may cause the solution to have a pH of 3.5 or less, or a pH of 3 or less.

The optional catalyst may, in some embodiments, be an orthophosphate catalyst. In other embodiments, the optional catalyst may be citric acid, hydrochloric acid, phosphoric acid, nitric acid, maleic acid, lactic acid, acetic acid, or paratoluene sulfonic acid. In some embodiments, one or more catalysts may be used. For example, in accordance with one or more embodiments, two catalysts may be used wherein the first acid catalyst may be selected from the group consisting of orthophosphoric acid, nitric acid, acetic acid, hydrochloric acid, and maleic acid and the second acid catalyst may be selected from the group consisting of citric acid, maleic acid, acetic acid, paratoluene sulfonic acid, and lactic acid. Some acid catalysts may be particularly desirable if the overcoat layer and resulting coated film structure are to be used in the food packaging industry, as certain acid catalysts (such as phosphoric acids and citric acids) are generally recognized as safe for use, or "GRAS" products.

The overcoat layer may also optionally include one or more other additives, including, but not limited to, biocides.

Suitable biocides may include, by way of example and not limitation, those commercially available under the trade name Proxel®, including Proxel® GXL 5%, available from Lonza Group (Basel, Switzerland).

In one or more embodiments, the overcoat layer has a dry coat weight of from about 0.05 g/m² to about 1.5 g/m². In other embodiments, the overcoat layer has a dry coat weight of from about 0.05 g/m² to about 1.0 g/m²; from about 0.1 g/m² to about 0.5 g/m²; or from about 0.3 g/m² to about 0.7 g/m². In further embodiments, the overcoat layer may comprise at least 50% by dry coat weight of polyvinyl alcohol, or at least 60 by dry coat weight of polyvinyl alcohol. Said another way, in other embodiments, the overcoat layer may comprise from 60 to 100% by dry coat weight of polyvinyl alcohol.

Referring to FIG. 1, in one or more embodiments, a coated film structure 100 comprises at least one intermediate layer 104 disposed between the substrate layer 102 and the overcoat layer 106. The intermediate layer 104 may be, for example, disposed on the substrate layer 102. The intermediate layer 104 may be in contact with the substrate layer 102, the overcoat layer 106, or both.

According to one or more embodiments, the intermediate layer 104 may include metals, metal oxides, or both. In at least one embodiment, the intermediate layer 104 comprises aluminum oxide. The intermediate layer 104 may have a thickness of from about 5 nm to about 30 nm, from about 5 nm to about 25 nm, from about 5 nm to about 15 nm, or from about 5 nm to about 10 nm.

The coated film structure may have a rigid amorphous fraction (RAF) at an interface of the overcoat layer 106 and the at least one intermediate layer 104. A RAF can form within a semi-crystalline polymer or at the interface of materials with different crystallinities. The RAF has more degrees of freedom than a crystalline structure, but less freedom than an amorphous polymer. Without being limited by theory, it is believed the RAF is created when an amorphous fraction of a polymer is contained within ordered fractions. The ordered fractions may be crystalline in nature or inorganic, such as metals and metal oxides. The amorphous nature of the polymer allows it some degree of freedom, but that freedom is limited by being bounded by crystalline or inorganic fractions.

Figure 3:
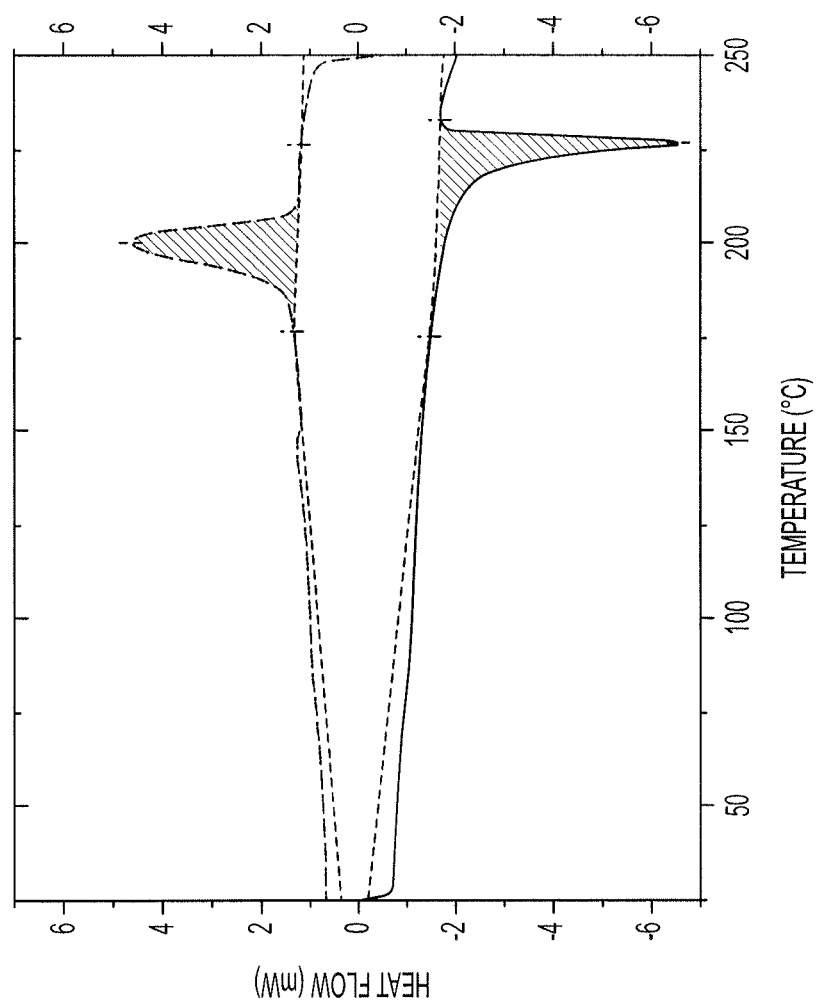
FIG. 3 depicts a graph plotted from a temperature modulated differential scanning calorimetry scan of a polyvinyl alcohol sample, according to one or more embodiments described herein.

The degree to which a polymer is crystalline, semi-crystalline, or amorphous may be characterized by the crystallinity of the polymer ($x_{cryst}$). The crystallinity of a polymer can be measured through differential scanning calorimetry (DSC), which measures the amount of heat required to increase the temperature of a sample as a function of temperature. In a DSC scan, a sample and a reference are heated and cooled while the input or output of heat energy is measured and plotted as a function of the temperature. FIG. 3 shows one such plot of the heat flow into or out of a sample as a function of temperature. This scan works to detect physical transformations such as phase transitions or glass transitions, because as a sample undergoes these transitions, its heat capacity varies. In the DSC graphs used to analyze embodiments described herein, the first incline typically depicts the glass transition temperature ($T_g$) of a polymer, followed by trough (a large decline in heat flow) when the polymer reaches its crystallization temperature ($T_c$), followed by a final peak when the polymer reaches its melting temperature. Most amorphous polymers will not have obvious crystallization troughs or melting temperature peaks. The term "peak," as used herein, refers to an uptrend or downtrend of data on a graph, such as a spike or a trough. In more complex DSC scans, sometimes referred to as temperature modulated differential scanning calorimetry (TMDSC), the temperature of the sample is modified in a periodic relationship, such as, by way of non-limiting example, a sinusoidal temperature modulation. By introducing a periodic temperature modulation, the sample reacts to the most instant changes as well as the general trends occurring over a period of minutes. The response of the sample to the repeated heating periods, cooling periods, delays, and relaxation times allows for the measurement of the specific heat of the sample at a constant pressure ($\Delta c_p^*$). As used in this context, a "delay" refers to the short-term time period in-between heating or cooling inputs to the sample, whereas "relaxation times" refer to the long-term time periods between phases or general trend segments of the TMDSC scan. The DSC graph can also be used to calculate the enthalpy of melting ($\Delta H_m$), which is determined as the area of the melting peak and the enthalpy of crystallization ($\Delta H_c$), which is determined as the area of the crystallization peak (or trough). Referring to FIG. 3, the melting peak is at about 200° C. while the crystallization peak is at about 225° C.

In one or more embodiments, the overcoat layer has a glass transition temperature ($T_g$) of less than 75° C. In other embodiments, the overcoat layer has a glass transition temperature of less than 72° C., less than 70° C., or even less than 68° C.

In one or more embodiments, the crystallinity ($x_{cryst}$) of a polymer phase may be characterized by equation 1.

$$x_{cryst} = \frac{\Delta H_m - \Delta H_c}{\Delta H_m^\circ} * 100 \qquad \text{Eq. (1)}$$

In equation 1, $\Delta H_m^\circ$ is a standard reference value which refers to the heat of melting of a completely crystalline polymer.

A TMDSC scan also allows a person of ordinary skill to determine the weight percentage of RAF within a polymer phase that makes up the coated film structure. For example, in one or more embodiments, the weight percent RAF (% RAF) may be calculated according equation 2.

$$\% RAF = \frac{\Delta c_p^*}{\Delta c_p^{amorph}} (1 - x_{cryst}) \qquad \text{Eq. (2)}$$

In equation 2, $\Delta c_p^{amorph}$ is the heat capacity normalized to the amorphous fraction of the overcoat layer. The $\Delta c_p^{amorph}$ may be measured by allowing a polymer sample to melt in the TMDSC instrument, resulting in a completely amorphous variant of the polymer. Subsequently, the melted sample undergoes rapid cooling. In one embodiment, the rapid cooling occurs at a cooling rate of −100° C./min; however, other cooling procedures would be considered suitable and familiar to one of ordinary skill in the art.

In one or more embodiments, a coated film structure comprises from 20 wt. % to 40 wt. % RAF (% RAF), based on the total weight of the overcoat layer 106 within the coated film structure. In other embodiments, a the coated film structure comprises from 20% RAF to 30% RAF, from 25% RAF to 30% RAF, from 30% RAF to 40% RAF, at least 20% RAF, at least 25% RAF, at least 30% RAF or at least 35% RAF, based on the total weight of the overcoat layer 106 within the film structure.

In various embodiments, the coated film structure may further comprise at least one coating layer 108. In at least one embodiment, at least one coating layer 108 is located between the polymer film substrate and the intermediate layer 104. In other embodiments, at least one additional coating layer 108 may be applied to the overcoat layer 106 in such a way that the additional coating layer 108 does not contact the substrate or intermediate layer 104. In still other embodiments, two or more additional coating layers 108 may be included in the coated film structure. The additional coating layer 108 may be, for example, one of the overcoat formulations described above and applied between the polymer film substrate and the intermediate layer 104. The additional coating layer 108 may include, for example, a polyvinyl alcohol, a polyurethane, a polyolefin or mixtures thereof. Similar to the overcoat layer 106, the additional coating layer 108 may optionally include one or more additives, such as biocides, adhesion enhancers, crosslinking agents, or the like. In embodiments in which an additional coating layer 108 and an overcoat layer 106 are employed, the additional coating layer 108 and the overcoat layer 106 may have the same formulation, or may have different formulations.

Figure 2:
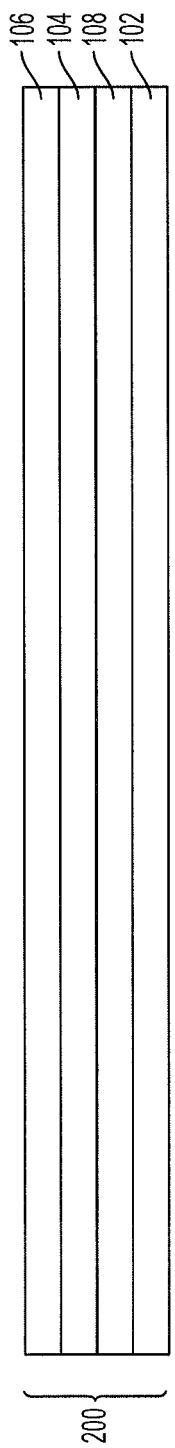
FIG. 2 schematically depicts a cross-sectional side view of a coated film structure according to one or more embodiments described herein.

Referring to FIG. 2, in one or more embodiments, a coated film structure 200 comprises a substrate layer 102, a coating layer 108, an intermediate layer 104, and an overcoat layer 106. The coating layer 108 is disposed between the intermediate layer 104 and the substrate layer 102 such that it does not contact the overcoat layer 106. Still referring to FIG. 2, the intermediate layer 104 is not in contact with the substrate layer 102 because of the placement of the intervening coating layer 108.

In one or more embodiments, the at least one coating layer 108 has a dry coat weight of from about 0.05 $g/m^2$ to about 1.5 $g/m^2$. In other embodiments, the at least one coating layer 108 has a dry coat weight of from about 0.05 $g/m^2$ to about 1.0 $g/m^2$; from about 0.1 $g/m^2$ to about 0.5 $g/m^2$; or from about 0.3 $g/m^2$ to about 0.7 $g/m^2$. The combined coat weights of all coating layers 108 are less than or equal to about 4.5 $g/m^2$, less than or equal to about 3.0 $g/m^2$, or even less than or equal to about 2.0 $g/m^2$.

In one or more embodiments, the coated film structure further includes at least one layer including a laminate adhesive. In other embodiments, the coated film structure further comprises a second substrate layer. The laminate adhesive may be located in the overcoat layer 106 or in an additional coating layer 108. In other embodiments, the laminate adhesive may be located in a layer between the first substrate layer 102 and the second substrate layer. Laminate adhesives include polyurethane based adhesives that can either be single component or two component adhesives where the degree of crosslinking is determined for a particular end use. Suitable adhesives include, as a non-limiting example, those commercially available under the tradename Loctite Liofol® (including, for example, Loctite Liofol® LA 2760/LA 5028), available from Henkel AG & Company (Dusseldorf, Germany). Suitable adhesives also include, by way of example and not limitation, those with bond strengths between 2.5 newtons per inch (N/inch) to 10 N/inch.

In various embodiments, the coated film structure exhibits improved barrier properties to oxygen and water vapor as compared to structures including metalized barrier layers alone. For example, various embodiments of the coated film structure exhibit oxygen transmission rates of less than about 0.70 $cm^3/m^2/day$ at 90% relative humidity and 23° C. as measured in accordance with ASTM D3985. In other embodiments, the coated film structure may exhibit oxygen transmission rates from about 0.1 $cm^3/m^2/day$ to about 0.2 $cm^3/m^2/day$ at 0% relative humidity and 23° C., and from about 0.05 $cm^3/m^2/day$ to about 0.50 $cm^3/m^2/day$ at 90% relative humidity and 23° C. as measured in accordance with ASTM D3985.

In one or more embodiments, the coated film structure has a water vapor transmission rate of less than 1.00 g/m2/day at 90% relative humidity and 37.8° C. as measured in accordance with ASTM E-398. In other embodiments, the coated film structure has a water vapor transmission rate of less than 0.75 $g/m^2/day$ or even less than 0.5 $g/m^2/day$ at 90% relative humidity and 37.8° C. as measured in accordance with ASTM E-398.

The improved barrier properties of embodiment coated film structures of the present disclosure may continue over the lifetime of the coated film structure. Gelbo flex testing (ASTM F392) measures the flex durability of flexible packaging materials. The flex durability can be quantified as the resistance of the barrier material against repetitive strain. In some embodiments, the oxygen barrier remains unchanged after 5 flexes.

Various synthesis methods are contemplated for making the coated film structures and constituent layers. The overcoat layer 106 or additional coating layers 108 may be prepared as a solution in organic solvents, inorganic solvents, or combinations thereof. Alternatively, each overcoat layer 106 or additional coating layer 108 may be prepared as an aqueous emulsion. The layer compositions, in solution or emulsion form, may be applied to the substrate or other layers of the coated film structure. In still other embodiments, the layer composition may be vaporized on applied to the coated film structure via vapor deposition.

The intermediate layer 104 may be deposited on the substrate layer 102 in any suitable way. For example, the intermediate layer 104 may be deposited on the polymer film substrate using chemical vapor deposition ("CVD"), physical vapor deposition ("PVD"), vacuum vapor deposition, or atomic layer deposition ("ALD"). In one particular embodiment, the intermediate layer 104 is deposited on the polymer film substrate by PVD.

In one embodiment, the overcoat layer 106 may be prepared by adding the constituent components to a mixing vessel and mixing at ambient temperatures until all of the components are uniform. However, it is contemplated that other methods for preparing the overcoat layer 106 may be employed, including methods of mixing the components at increased temperature, increased pressures, in the presence of solubilizing agents, or combinations thereof. As used herein, solubilizing agents include rheology modifiers, pH buffering agents, counter salts, or other compound that aid in the mixing of a uniform overcoat layer 106 composition.

The overcoat layer 106 can be applied using a gravure coating, flexographic coating, or other application methods. A reverse gravure kiss coating geometry may be used to minimize damage to the intermediate layer 104 or other layers. After the overcoat layer 106 is applied, it may be dried by hot air, radiant heat, ambiently dried, or any other suitable means to provide an adherent coated film structure. Additional coating layers 108 may also be applied and dried by similar methods.

After all layers of the coated film structure are applied, the coated film structure may be cured before its barrier properties are tested. The curing may occur ambiently or actively. Ambient curing involves leaving the coated film structure to rest at atmospheric conditions. Active curing may involve the application of heat, a vacuum, or electromagnetic radiation.

EXAMPLES

In order that various embodiments may be more readily understood, reference is made to the following examples which are intended to illustrate various embodiments, but not limit the scope thereof.

Example 1: Improved Oxygen Barrier Properties of Coated Film Structures

An example coated film structure comprising a BOPET polymer film substrate was prepared with an aluminum oxide (AlOx) intermediate layer and a polyvinyl alcohol (PVOH) overcoat. Next, its oxygen transmission rates were compared against two comparative examples. The example has an intermediate layer comprising AlOx disposed between the BOPET film substrate layer and the overcoat layer comprising PVOH. The AlOx was applied by physical vapor deposition via thermal evaporation and reactive oxidation at a thickness of about 10 nm. Comparative Example A has an aluminum oxide containing layer, but no overcoat layer. Comparative Example B has no aluminum oxide containing layer, but is coated with the PVOH overcoat. All substrate films used were commercial grade packaging films with a thickness of 12 µm. The substrate films of Examples 1-3 and Comparative Example A were coated with AlOx at a thickness of 10 nm. The formulations for the PVOH overcoat are summarized in Table 1.

TABLE 1

PVOH Overcoat Formulation

| Component | Description | wt. % |
|---|---|---|
| Deionized water | | 87.60 |
| Nippon Gohsei G-polymer ™ AZF8035Q | PVOH | 8.60 |
| Cymel ® 385 from Allnex | MF crosslinker | 1.80 |
| PEI Loxanol ® MI6730 from BASF | PEI adhesion enhancer | 0.95 |
| Orthophosphoric acid 85% | Catalyst for MF crosslinker | 0.70 |
| Formaldehyde 37% | Crosslinker for PEI | 0.19 |
| Proxel ® GXL 5% | Biocide | 0.16 |

The PVOH overcoat formulation was prepared by mixing the components in a paddle mixer at room temperature until uniform. The liquid overcoat formulations were applied to the examples using a 330 mm width pilot coater at speeds of 25 meters per minute using a reverse roll coating rod with 180LQC etching.

The oxygen transmission rate of the coated film structure including an intermediate layer and an overcoat layer was compared with the oxygen transmission rates of comparative example film structures. Oxygen transmission rates at low humidity (0% RH) and high humidity (90% RH) at 23° C. were measured in accordance with ASTM D3985. Humidity was applied directly to coated side of the substrate; the other side of the substrate was maintained at 0% RH. The oxygen transmission rates of the examples and comparative examples are summarized in Table 2.

TABLE 2

Oxygen Transmission Rates for Various Structures

| | | Oxygen Transmission Rate ($cm^3/m^2/day$) | |
|---|---|---|---|
| | Structure | 0% RH | 90% RH |
| Comparative Example A | BOPET/AlOx | 2.66 | 2.46 |
| Comparative Example B | BOPET/PVOH Overcoat | 0.24 | 36.3 |
| Example 1 | BOPET/AlOx/ PVOH Overcoat | 0.2 | 0.08 |

The data in Table 2 show that coated film structures having both an intermediate layer comprising aluminum oxide and an overcoat layer are more effective at limiting oxygen transmission than a film with either layer alone.

Example 2: Improved Water Vapor Barrier Properties of Coated Film Substrates

Various coated film structures were prepared with PVOH overcoats. The structures were prepared similar to Example 1, but different polyvinyl alcohols were incorporated. The overcoat of Example 2 comprises G-Polymer™, an amorphous PVOH commercially available from Nippon Gohsei (Japan). The overcoat was applied over the AlOx layer at a dry coat weight of about 0.5 gsm. The water vapor transmission rates of this film structure was compared to Comparative Examples C and D. Comparative Example C is a commercial grade packaging film with a thickness of 12 µm that has been coated with the same overcoat as Example 2. Comparative Example D is a commercial grade packaging film with a thickness of 12 µm that has an intermediate layer comprising AlOx and an overcoat layer comprising Selvol E107, a crystalline PVOH from Sekisui Specialty Chemicals (Japan). The crystalline properties of all samples were measured via TMDSC scan using a Mettler Toledo DSC3. Additionally the water vapor transmission rate of each coated film structure was measured at 38.7° C. and 90% relative humidity in accordance with ASTM E-398. The results of these measurements are summarized in Table 3.

TABLE 3

Water Vapor Transmission Rates and Crystalline Properties of Various Structures

| Total construction | | | | | |
|---|---|---|---|---|---|
| | | Water Vapor Transmission Rate | Overcoat layer properties | | |
| Sample | Film Description | ($g/m^2 \cdot atm \cdot day$) | $T_g$ (° C.) | $x_{cryst}$ | % RAF |
| Example 2 | BOPET/AlOx/G-Polymer | 0.15 | 71.59 | 13.50 | 38.21 |
| Comparative Example C | BOPET/G-Polymer | 28.29 | 52.08 | 0 | 20.7 |
| Comparative Example D | BOPET/AlOx/Selvol | 1.12 | 57.5 | 31.00 | 12.38 |

As can be seen in Table 3, the water vapor transmission rate of Example 2 is lower than that of the Comparative Examples. In addition to the water vapor barrier properties of the coated film structures shown in Table 3, one or more embodiment coated film structures surprisingly also exhibit improved water vapor transmission rates in hydrophilic environments.

Ten percent by weight glycerol, a hydrophilic plasticizer, was added to Example 2 and Comparative Example D to compare the water vapor transmission rates of the examples in hydrophilic environments. The water vapor transmission rate of the resulting coated film structures (named Example 2' and Comparative Example D') were measured at 38.7° C. and 90% relative humidity in accordance with ASTM E-398. Additionally, the crystallinity of the overcoat layers on these coated film structures were measured via TMDSC scan using a Mettler Toledo DSC3. These measurements are summarized in Table 4.

TABLE 4

Water Vapor Transmission Rates and Crystalline Properties of Various Structures

| Sample | Film Description | Total construction Water Vapor Transmission Rate (g/m² · atm · day) | Overcoat layer properties $T_g$ (° C.) | $x_{cryst}$ | % RAF |
|---|---|---|---|---|---|
| Example 2 | BOPET/AlOx/ G-Polymer | 0.15 | 71.59 | 13.50 | 38.21 |
| Example 2' | BOPET/AlOx/ G-Polymer/ Glycerol | 0.19 | 38.62 | 6.4 | 41.39 |
| Comparative Example D | BOPET/AlOx/ Selvol | 1.12 | 57.5 | 31.00 | 12.38 |
| Comparative Example D' | BOPET/AlOx/ Selvol/Glycerol | 3.39 | 24.68 | 20.01 | 11.51 |

The addition of a hydrophilic plasticizer to the film structure would be expected to drastically increase the water vapor transmission rate of the coated film structure. Without being limited by theory, this is believed to at least be in part due to the hydrophilic environment created around the coated film structure by the addition of the hydrophilic plasticizer. This hydrophilic environment is expected to be more conducive to the transport of water vapor. This is the phenomenon seen in Comparative Example D and Comparative Example D'. However, in the context of an embodiment coated film structure comprising an amorphous polyvinyl alcohol the water vapor barrier is maintained even in the presence of a hydrophilic plasticizer. Without being limited by theory, the increased % RAF of Example 3' as compared to coated film structures comprising crystalline PVOH is believed to be at least in part responsible for the surprising maintenance of the water vapor barrier even in a hydrophilic environment. The increase in % RAF with the addition of a plasticizer is in and of itself surprising. Plasticizers are expected to decrease the degrees of freedom of a polymer, thereby decreasing the % RAF. However, the increase in % RAF of Example 3' as compared to Example 3 in combination with the comparable water vapor transmission rates between Example 3 and Example 3' is believed to be the result of an unexpected interaction at the interface of the intermediate layer comprising AlOx and the overcoat layer comprising PVOH.

Example 3: Overcoat Data

Without being limited by theory, it is believed the improved barrier properties of the coated film structures are due not just to the composition of the constituent layers, but also the order of the layers. To demonstrate this, a coated film structure, Example 3, was prepared with a BOPET polymer film substrate, an AlOx intermediate layer, and a Michem® Flex P888 overcoat layer. This overcoat layer comprises an uncrosslinked amorphous type PVOH and is commercially available from Michelman, Inc. (Blue Ash, Ohio, United States). The barrier properties of this coated film structure were compared with Comparative Example E and Comparative Example F. Comparative Example E is a BOPET polymer film substrate with just an AlOx coating. Comparative Example F is a BOPET polymer film substrate with a PVOH intermediate layer and an AlOx overcoat layer. The AlOx of each Example and Comparative Example was applied by physical vapor deposition via thermal evaporation and reactive oxidation at a thickness of about 10 nm. Example 3 and Comparative Example F have overcoat layers applied at a dry coat weight of about 0.4 gsm. The oxygen transmission rate was measured at 23° C. and 50% relative humidity in accordance with ASTM 3985. The water vapor transmission rate was measured at 37.8° C. and 90% relative humidity in accordance with ASTM E-398. These measurements are summarized in Table 5.

TABLE 5

Barrier Properties of Various Structures

| Sample | Film Description | Oxygen Transmission Rate (cm³/m²/day) | Water Vapor Transmission Rate (g/m² · atm · day) |
|---|---|---|---|
| Example 3 | BOPET/AlOx/PVOH | 0.18 ± 0.13 | 0.82 ± 0.06 |
| Comparative Example E | BOPET/AlOX | 0.93 ± 0.07 | 0.64 ± 0.03 |
| Comparative Example F | PET/PVOH/AlOx | 0.1 ± 0.03 | 1.56 ± 0.06 |

The data in Table 5 shows that water vapor transmission rate is dependent on the order of the coatings as Comparative Example F allows about twice as much water vapor transmission as Example 3.

Example 4: Gelbo Flex Testing

In addition to the barrier properties exhibited by the coated film structures, it is believed these coated film structures uniquely retain these barrier properties even after subjected to successive deformations. Gelbo Flex testing allows for the measurement of oxygen transmission rates after a series of deformations. A Gelbo Flex test according to ASTM F392 was performed on a coated film structure, Example 4, comprising a 12 μm thick BOPET polymer film substrate, an AlOx intermediate layer, and a Michem® Flex P888 overcoat layer. This film was then laminated in a triplex structure to a 40 μm thick polyethylene film on one side and to 12 μm thick BOPET on the other side using Liofol® LA 2760/LA 5028 adhesives from Henkel Corporation. As described previously, this overcoat layer comprises an uncrosslinked amorphous type PVOH and is commercially available from Michelman, Inc. (Blue Ash, Ohio, United States).

TABLE 6

Gelbo Flex Testing for Coated Film Structure

| Sample | Oxygen Transmission Rate (cm³/m²/day) |
|---|---|
| Example 4 Zero Deformations | 0.51 ± 0.15 |
| Example 4 After 5 Deformations | 0.72 ± 0.15 |

As can be seen from the data in Table 6, the coated film structure exhibited a similar oxygen transmission rate even after five deformations.

Unless otherwise indicated, the disclosure of any ranges in the specification and claims are to be understood as including the range itself and also anything subsumed therein, as well as endpoints.

It will be apparent to those skilled in the art that modifications and variations can be made to the embodiments described herein without departing from the spirit and scope of the claimed subject matter. Thus it is intended that the specification cover the modifications and variations of the various embodiments described herein provided such modifications and variations come within the scope of the appended claims and their equivalents.

What is claimed is:

1. A coated film structure comprising:
   a substrate layer comprising a polymer film substrate, the substrate layer having a thickness of from 1 μm to 120 μm;
   an overcoat layer comprising amorphous polyvinyl alcohol, the overcoat layer having a dry coat weight of from about 0.05 g/m² to about 1.5 g/m²; and
   at least one intermediate layer disposed between the substrate layer and the overcoat layer, the intermediate layer comprising aluminum oxide and having a thickness from about 5 nm to about 30 nm;
   wherein the coated film structure comprises a rigid amorphous fraction (RAF) at an interface of the overcoat layer and the at least one intermediate layer, the overcoat layer comprising at least 30 weight percent RAF (% RAF) based on the total weight of the overcoat layer;
   wherein the coated film structure has an oxygen transmission rate of less than about 0.70 cm³/m²/day at 90% relative humidity and 23° C. as measured in accordance with ASTM D3985; and
   a water vapor transmission rate of less than 1.00 g/m²/day at 90% relative humidity and 37.8° C. as measured in accordance with ASTM E-398.

2. The coated film structure of claim 1, wherein the polymer film substrate comprises a polymer selected from the group consisting of polylactic acid (PLA), polyethylene terephthalate (PET), biaxially oriented polyethylene terephthalate (BOPET), oriented polypropylene (OPP), biaxially oriented polypropylene (BOPP), cast Polypropylene (CPP), Polyethylene (PE) and biaxially oriented polyamide.

3. The coated film structure of claim 1, further comprising at least one coating layer located between the substrate layer and the at least one intermediate layer.

4. The coated film structure of claim 3, wherein the at least one coating layer comprises polyvinyl alcohol.

5. The coated film structure of claim 1, wherein the coated film structure has an oxygen transmission rate of from about 0.1 cm³/m²/day to about 0.2 cm³/m²/day at 0% relative humidity at 23° C.

6. The coated film structure of claim 1, wherein the overcoat layer has a glass transition temperature (Tg) of less than 75° C.

7. The coated film structure of claim 1, wherein the at least one intermediate layer, the overcoat layer, or both comprise one or more additives selected from a wax, a biocide, an adhesive, or combinations thereof.

8. The coated film structure of claim 1, wherein the polymer film substrate comprises BOPET.

9. The coated film structure of claim 1, wherein the overcoat layer further comprises an adhesion promoter.

10. The coated film structure of claim 1, wherein the overcoat layer further comprises a polyethylene wax.

11. The coated film structure of claim 10, wherein the overcoat layer further comprises a catalyst.

12. The coated film structure of claim 1, wherein the overcoat layer further comprises a crosslinker.

13. The coated film structure of claim 1, wherein the overcoat layer further comprises a crosslinker for the amorphous polyvinyl alcohol;
   an adhesion enhancer comprising polyethylene imine; a crosslinker for the polyethylene imine; and a catalyst.

14. The coated film structure of claim 1, wherein the overcoat layer has the dry coat weight of from about 0.10 g/m² to about 0.75 g/m²; and wherein the intermediate layer has a thickness from about 5 nm to about 15 nm.

15. The coated film structure of claim 1, wherein the overcoat layer has the dry coat weight of from about 0.15 g/m² to about 0.6 g/m²; and wherein the intermediate layer has a thickness from about 5 nm to about 10 nm.

16. A coated film structure comprising:
   a biaxially oriented polyethylene terephthalate (BOPET) substrate layer having a thickness of from 1 μm to 120 μm;
   an overcoat layer comprising amorphous polyvinyl alcohol, the overcoat layer having a dry coat weight of from about 0.05 g/m² to about 1.5 g/m²; and
   an intermediate layer disposed between the BOPET substrate layer and the overcoat layer, the intermediate layer comprising aluminum oxide and having a thickness from about 5 nm to about 30 nm;
   wherein the coated film structure comprises a rigid amorphous fraction (RAF) at an interface of the overcoat layer and the intermediate layer, the overcoat layer comprising at least 30 weight percent RAF (% RAF) based on the total weight of the overcoat layer;
   wherein the coated film structure has an oxygen transmission rate of less than about 0.70 cm³/m²/day at 90% relative humidity and 23° C. as measured in accordance with ASTM D3985; and
   a water vapor transmission rate of less than 1.00 g/m²/day at 90% relative humidity and 37.8° C. as measured in accordance with ASTM E-398.

17. The coated film structure of claim 16, wherein the overcoat layer has the dry coat weight of from about 0.10 g/m² to about 0.75 g/m²; and wherein the intermediate layer has a thickness from about 5 nm to about 15 nm.

18. The coated film structure of claim 16, wherein the overcoat layer has the dry coat weight of from about 0.15 g/m² to about 0.6 g/m²; and wherein the intermediate layer has a thickness from about 5 nm to about 10 nm.

* * * * *